(12) United States Patent
Abe et al.

(10) Patent No.: US 7,172,527 B2
(45) Date of Patent: Feb. 6, 2007

(54) PLANETARY-GEAR-TYPE MULTIPLE-STEP TRANSMISSION FOR VEHICLE

(75) Inventors: Akiharu Abe, Toyota (JP); Akira Hoshino, Nishikamo-gun (JP); Atsushi Tabata, Okazaki (JP); Atsushi Honda, Seto (JP); Terufumi Miyazaki, Toyota (JP); Hirofumi Ota, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 160 days.

(21) Appl. No.: 10/964,996

(22) Filed: Oct. 15, 2004

(65) Prior Publication Data
US 2005/0090362 A1   Apr. 28, 2005

(30) Foreign Application Priority Data
Oct. 27, 2003   (JP) .............................. 2003-365691

(51) Int. Cl.
*F16H 3/62* (2006.01)
(52) U.S. Cl. ........................................ 475/276
(58) Field of Classification Search ................ 475/275, 475/276
See application file for complete search history.

(56) References Cited

U.S. PATENT DOCUMENTS

| | | | |
|---|---|---|---|
| 6,558,287 B2* | 5/2003 | Hayabuchi et al. .......... | 475/271 |
| 6,634,980 B1 | 10/2003 | Ziemer | |
| 6,887,178 B2* | 5/2005 | Miyazaki et al. ........... | 475/276 |
| 7,029,416 B2* | 4/2006 | Miyazaki et al. ........... | 475/275 |
| 7,044,881 B2* | 5/2006 | Tabata et al. ................ | 475/284 |
| 2004/0097324 A1 | 5/2004 | Ziemer | |

FOREIGN PATENT DOCUMENTS

| | | |
|---|---|---|
| DE | 101 15 983 A1 | 10/2002 |
| JP | 4-219553 | 8/1992 |
| JP | 8-105496 | 4/1996 |
| JP | 2956173 | 7/1999 |
| JP | 2000-199549 | 7/2000 |
| JP | 2000-266138 | 9/2000 |
| JP | 2001-82555 | 3/2001 |

(Continued)

*Primary Examiner*—Dirk Wright
(74) *Attorney, Agent, or Firm*—Oblon, Spivak, McClelland, Maier & Neustadt, P.C.

(57) ABSTRACT

A planetary-gear-type multiple-step transmission including a stationary member, an input rotary member, an output rotary member, and first and second transmission units. The first transmission unit has first and second intermediate transmitting paths through which a rotary motion of the input rotary member is transmittable to the second transmission unit such that a speed of the rotary motion transmitted through the second intermediate transmitting path is lower than a speed of the rotary motion transmitted through the first intermediate transmitting path. The second transmission unit constitutes first, second, third and fourth rotary modules, each of which is provided by at least one of sun gears, carriers and ring gears of two planetary gear sets. The first rotary module is selectively connected to the second intermediate transmitting path, while being selectively connected to the stationary member. The second rotary module is selectively connected to the first intermediate transmitting path, while being selectively connected to the stationary member. The third rotary module is connected to the output rotary member. The fourth rotary module is selectively connected to the first intermediate transmitting path, while being selectively connected to the second intermediate transmitting path.

14 Claims, 5 Drawing Sheets

FOREIGN PATENT DOCUMENTS

| | | |
|---|---|---|
| JP | 2001-182785 | 7/2001 |
| JP | 2002-206601 | 7/2002 |
| JP | 2002-227940 | 8/2002 |
| JP | 2002-295609 | 10/2002 |
| JP | 2002-323098 | 11/2002 |
| WO | WO 01/27496 A1 | 4/2001 |

* cited by examiner

FIG.3

|  | C1 | C2 | C3 | C4 | B1 | B2 | RATIOS | RATIO STEPS |
|---|---|---|---|---|---|---|---|---|
| 1st | O |  |  |  |  | O | 4.579 |  |
| 2nd | O |  |  |  | O |  | 3.274 | 1.399 |
| 3rd | O | O |  |  |  |  | 2.449 | 1.337 |
| 4th |  |  |  | O |  | O | 1.870 | 1.310 |
| 5th |  |  |  | O | O |  | 1.337 | 1.399 |
| (5.5th) |  | O |  | O |  |  | 1.175 | 1.337 |
| 6th |  |  | O | O |  |  | 1.000 |  |
| 7th |  | O | O |  |  |  | 0.728 | 1.374 |
| 8th |  |  | O |  |  | O | 0.613 | 1.188 |
| R |  | O |  |  |  | O | 3.876 | RATIO SPREAD 7.472 |

PLANETARY-GEAR-TYPE MULTIPLE-STEP TRANSMISSION FOR VEHICLE

This application is based on Japanese Patent Application No. 2003-365691 filed in Oct. 27, 2003, the content of which is incorporated hereinto by reference.

BACKGROUND OF THE INVENTION

1. Field of the Invention

The present invention relates to a planetary-gear-type multiple-step transmission interposed between a drive power source and drive wheels of a vehicle such as an automobile.

2. Discussion of Related Art

For vehicle, there is widely used a planetary-gear-type multiple-step transmission which is equipped with a plurality of planetary gear sets, as disclosed in JP-2002-206601A. In such a planetary-gear-type multiple-step transmission, a plurality of predetermined speed ratios or drive positions (gear positions) are selectively established by connecting elements of the planetary gear sets through coupling devices such as clutches and brakes. For example, in the transmission disclosed in JP-2002-206601A, a total of twelve forward drive positions are established by using four planetary gear sets.

The planetary-gear-type multiple-step transmission is required to be not only simple in construction and small in size and to provide a large number of drive positions and a wide range of speed ratio, but also to provide speed ratios that change in geometric progression or nearly geometric progression. However, these requirements are difficult to be fully satisfied. In the multiple-step transmission disclosed in JP-2002-206601A, the speed ratios of the respective drive positions do not change in geometric progression, thereby resulting in a poor maneuverability in the transmission. In the transmission of JP-2002-206601A, for example, a ratio step between the speed ratio of the sixth-speed position and the speed ratio of the seventh-speed position is 1.050 (=1.391/1.325), which is considerably lower than the other ratio steps between other adjacent speed positions (see FIG. 5 of the publication of Japanese Patent Application). That is, in this transmission, the ratio steps between adjacent speed positions considerably change, rather than being substantially uniform. Such a problem might be solved by increasing number of planetary gear sets to be incorporated in the transmission. However, the increase in the number of planetary gear sets leads to an increase in an overall length of the transmission, thereby possibly reducing a degree of freedom in installation of the transmission on a vehicle, while increasing number of coupling devices required for connecting elements of the planetary gear sets.

SUMMARY OF THE INVENTION

The present invention was made in the light of the background art discussed above. It is therefore an object of the present invention to provide a small-sized planetary-gear-type multiple-step transmission capable of establishing drive positions with relatively width range of speed ratio and appropriate ratio steps between adjacent drive positions. This object of the invention may be achieved according to any one of first through seventeenth aspects of the invention which are described below.

The first aspect of this invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member. The first transmission unit has first and second intermediate transmitting paths through which a rotary motion of the input rotary member is transmittable to the second transmission unit such that a speed of the rotary motion transmitted through the second intermediate transmitting path is lower than a speed of the rotary motion transmitted through the first intermediate transmitting path. The second transmission unit includes two planetary gear sets each having a sun gear, a carrier and a ring gear, the second transmission unit further including first and second brakes, and first, second, third and fourth clutches. The second transmission unit constitutes first, second, third and fourth rotary modules, each of which is provided by at least one of the sun gears, carriers and ring gears of the two planetary gear sets. The first rotary module is selectively connected to the second intermediate transmitting path through the second clutch, while being selectively connected to the stationary member through the first brake. The second rotary module is selectively connected to the first intermediate transmitting path through the third clutch, while being selectively connected to the stationary member through the second brake. The third rotary module is connected to the output rotary member. The fourth rotary module is selectively connected to the first intermediate transmitting path through the fourth clutch, while being selectively connected to the second intermediate transmitting path through the first clutch. The plurality of drive positions are established by selectively engaging and releasing the brakes and the clutches.

According to the second aspect of the invention, in the planetary-gear-type multiple-step transmission defined in the first aspect of the invention, the second rotary module is rotatable at a rotational speed, which is intermediate between rotational speeds of the respective first and third rotary modules except when the rotational speeds of the respective first and third rotary modules are equal to each other. The third rotary module is rotatable at a rotational speed, which is intermediate between rotational speeds of the respective second and fourth rotary modules except when the rotational speeds of the respective second and fourth rotary modules are equal to each other. A difference between rotational speeds of the respective second and third rotary modules is larger than a difference between rotational speeds of the respective third and fourth rotary modules except when the rotational speeds of the respective second and fourth rotary modules are equal to each other.

According to the third aspect of the invention, the planetary-gear-type multiple-step transmission defined in the first or second aspect of the invention has at least eight drive positions consisting of a first-speed position, a second-speed position having a speed ratio lower than that of the first-speed position, a third-speed position having a speed ratio lower than that of the second-speed position, a fourth-speed position having a speed ratio lower than that of the third-speed position, a fifth-speed position having a speed ratio lower than that of the fourth-speed position, a sixth-speed position having a speed ratio lower than that of the fifth-speed position, a seventh-speed position having a speed ratio lower than that of the sixth-speed position, and an eighth-speed position having a speed ratio lower than that of the seventh-speed position. The first-speed position is established by engaging the first clutch and the second brake. The second-speed position is established by engaging the first clutch and the first brake. The third-speed position is established by engaging the first clutch and the second clutch. The fourth-speed position is established by engaging the fourth clutch and the second brake. The fifth-speed position is established by engaging the fourth clutch and the first brake. The sixth-speed position is established by engaging the third clutch and the fourth clutch. The seventh-speed position is established by engaging the second clutch and the third clutch. The eighth-speed position is established by engaging the third clutch and the first brake. The transmission further comprises a shifting-action controller which includes at least a third-speed-position establishing portion for causing the third-speed position to be established, and a fourth-speed-position establishing portion for causing the fourth-speed position to be established.

According to the fourth aspect of the invention, in the planetary-gear-type multiple-step transmission defined in the third aspect of the invention, the second rotary module is rotatable at a rotational speed which is intermediate between rotational speeds of the respective first and third rotary modules except when the rotational speeds of the respective first and third rotary modules are equal to each other. The third rotary module is rotatable at a rotational speed which is intermediate between rotational speeds of the respective second and fourth rotary modules except when the rotational speeds of the respective second and fourth rotary modules are equal to each other.

According to the fifth aspect of the invention, in the planetary-gear-type multiple-step transmission defined in any one of the first through fourth aspects of the invention, one of the two planetary gear sets is a double-pinion type planetary gear set, and includes the sun gear, the carrier, the ring gear and at least one pair of pinion gears which are rotatably held by the carrier and which mesh with each other. The other of the two planetary gear sets is a single-pinion type planetary gear set, and includes the sun gear, the carrier and the ring gear. The first rotary module includes the sun gear of the above-described one of the two planetary gear sets and the sun gear of the above-described other of the two planetary gear sets which are connected to each other. The second rotary module includes the ring gear of the above-described one of the two planetary gear sets and the carrier of the above-described other of the two planetary gear sets which are connected to each other. The third rotary module includes the ring gear of the above-described other of the two planetary gear sets. The fourth rotary module includes the carrier of the above-described one of the two planetary gear sets.

According to the sixth aspect of the invention, in the planetary-gear-type multiple-step transmission defined in any one of the first through fourth aspects of the invention, one of the two planetary gear sets is a double-pinion type planetary gear set, and includes the sun gear, the carrier, the ring gear and at least one pair of pinion gears which are rotatably held by the carrier and which mesh with each other. The other of the two planetary gear sets is a single-pinion type planetary gear set, and includes the sun gear, the carrier and the ring gear. The first rotary module includes the carrier of the above-described one of the two planetary gear sets and the sun gear of the above-described other of the two planetary gear sets which are connected to each other. The second rotary module includes the ring gear of the above-described one of the two planetary gear sets and the carrier of the above-described other of the two planetary gear sets which are connected to each other. The third rotary module includes the ring gear of the above-described other of the two planetary gear sets. The fourth rotary module includes the sun gear of the above-described one of the two planetary gear sets.

According to the seventh aspect of the invention, in the planetary-gear-type multiple-step transmission defined in any one of the first through fourth aspects of the invention, one of the two planetary gear sets is a double-pinion type planetary gear set, and includes the sun gear, the carrier, the ring gear and at least one pair of pinion gears which are rotatably held by the carrier and which mesh with each other. The other of the two planetary gear sets is a single-pinion type planetary gear set, and includes the sun gear, the carrier and the ring gear. The first rotary module includes the sun gear of the above-described one of the two planetary gear sets and the sun gear of the above-described other of the two planetary gear sets which are connected to each other. The second rotary module includes the ring gear of the above-described one of the two planetary gear sets. The third rotary module includes the carrier of the above-described other of the two planetary gear sets. The fourth rotary module includes the carrier of the above-described one of the two planetary gear sets and the ring gear of the above-described other of the two planetary gear sets which are connected to each other.

According to the eighth aspect of the invention, the planetary-gear-type multiple-step transmission defined in the third or fourth aspect of the invention has, in addition to the eight drive positions, an intermediate speed position which has a speed ratio lower than that of the fifth-speed position and higher than that of the sixth-speed position and which is established by engaging the second clutch and the fourth clutch. The transmission is shifted to one of the third-speed position and the intermediate speed position directly from the other of the third-speed position and the intermediate speed position, without the transmission being placed into the fourth-speed position and the fifth-speed position (during the shifting action between the third-speed position and the intermediate speed position), when a predetermined condition is satisfied.

According to the ninth aspect of the invention, the planetary-gear-type multiple-step transmission defined in the third, fourth or eighth aspect of the invention further has a rear drive position which is established by engaging the second clutch and the second brake.

According to the tenth aspect of the invention, in the planetary-gear-type multiple-step transmission defined in any one of the first through ninth aspects of the invention, the first transmission unit has a planetary gear set having three rotary elements. One of the three rotary elements of the planetary gear set of the first transmission unit is connected to the input rotary member, and constitutes at least a part of the first intermediate transmitting path, such that the rotary motion of the input rotary member is transmitted to the second transmission unit through the above-described one of the three rotary elements of the planetary gear set of the first transmission unit, without the speed of the rotary motion being changed. Another one of the three rotary elements of the planetary gear set of the first transmission unit is fixed to the stationary member so as to be unrotatable. Still another one of the three rotary elements of the planetary gear set of the first transmission unit constitutes at least a part of the second intermediate transmitting path, such that the rotary motion of the input rotary member is transmitted to the second transmission unit through the above-described still another one of the three rotary elements of the planetary gear set of the first transmission unit, with the speed of the rotary motion being reduced.

According to the eleventh aspect of the invention, the planetary-gear-type multiple-step transmission defined in any one of the first through tenth aspects of the invention further comprises a hydraulic transmission unit through which an output of a drive power source is transmitted to the input rotary member.

The twelfth aspect of this invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member. The first transmission unit has first and second intermediate transmitting paths through which a rotary motion of the input rotary member is transmittable to the second transmission unit such that a speed of the rotary motion transmitted through the second intermediate transmitting path is lower than a speed of the rotary motion transmitted through the first intermediate transmitting path. The second transmission unit includes two planetary gear sets, first and second brakes, and first, second, third and fourth clutches. A second planetary gear set as one of the two planetary gear sets is a double-pinion type planetary gear set, and includes a second sun gear, a second carrier, a second ring gear and at least one pair of pinion gears which are rotatably held by the second carrier and which mesh with each other. A third planetary gear set as the other of the two planetary gear sets is a single-pinion type planetary gear set, and includes a third sun gear, a third carrier and a third ring gear. The second sun gear and the third sun gear are selectively connected to the second intermediate transmitting path through the second clutch, while being selectively connected to the stationary member through the first brake. The second ring gear and the third carrier are selectively connected to the first intermediate transmitting path through the third clutch, while being selectively connected to the stationary member through the second brake. The third ring gear is connected to the output rotary member. The second carrier is selectively connected to the first intermediate transmitting path through the fourth clutch, while being selectively connected to the second intermediate transmitting path through the first clutch. The plurality of drive positions are established by selectively engaging and releasing the brakes and the clutches.

The thirteenth aspect of this invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member. The first transmission unit has first and second intermediate transmitting paths through which a rotary motion of the input rotary member is transmittable to the second transmission unit such that a speed of the rotary motion transmitted through the second intermediate transmitting path is lower than a speed of the rotary motion transmitted through the first intermediate transmitting path. The second transmission unit includes two planetary gear sets, first and second brakes, and first, second, third and fourth clutches. A second planetary gear set as one of the two planetary gear sets is a double-pinion type planetary gear set, and includes a second sun gear, a second carrier, a second ring gear and at least one pair of pinion gears which are rotatably held by the second carrier and which mesh with each other. A third planetary gear set as the other of the two planetary gear sets is a single-pinion type planetary gear set, and includes a third sun gear, a third carrier and a third ring gear. The second carrier and the third sun gear are selectively connected to the second intermediate transmitting path through the second clutch, while being selectively connected to the stationary member through the first brake. The second ring gear and the third carrier are selectively connected to the first intermediate transmitting path through the third clutch, while being selectively connected to the stationary member through the second brake. The third ring gear is connected to the output rotary member. The second sun gear is selectively connected to the first intermediate transmitting path through the fourth clutch, while being selectively connected to the second intermediate transmitting path through the first clutch. The plurality of drive positions are established by selectively engaging and releasing the brakes and the clutches.

The fourteenth aspect of this invention provides a planetary-gear-type multiple-step transmission for a vehicle, having a plurality of drive positions which are selectively established, the transmission comprising: (a) a stationary member; (b) an input rotary member; (c) an output rotary member; (d) a first transmission unit which is connected to the input rotary member; and (e) a second transmission unit which is connected to the output rotary member. The first transmission unit has first and second intermediate transmitting paths through which a rotary motion of the input rotary member is transmittable to the second transmission unit such that a speed of the rotary motion transmitted through the second intermediate transmitting path is lower than a speed of the rotary motion transmitted through the first intermediate transmitting path. The second transmission unit includes two planetary gear sets, first and second brakes, and first, second, third and fourth clutches. A second planetary gear set as one of the two planetary gear sets is a double-pinion type planetary gear set, and includes a second sun gear, a second carrier, a second ring gear and at least one pair of pinion gears which are rotatably held by the second carrier and which mesh with each other. A third planetary gear set as the other of the two planetary gear sets is a single-pinion type planetary gear set, and includes a third sun gear, a third carrier and a third ring gear. The second sun gear and the third sun gear are selectively connected to the second intermediate transmitting path through the second clutch, while being selectively connected to the stationary member through the first brake. The second ring gear is selectively connected to the first intermediate transmitting path through the third clutch, while being selectively connected to the stationary member through the second brake. The third carrier is connected to the output rotary member. The second carrier and the third ring gear are selectively connected to the first intermediate transmitting path through the fourth clutch, while being selectively connected to the second intermediate transmitting path through the first clutch. The plurality of drive positions are established by selectively engaging and releasing the brakes and the clutches.

According to the fifteenth aspect of the invention, in the planetary-gear-type multiple-step transmission defined in any one of the twelfth through fourteenth aspects of the invention, the first transmission unit includes a first planetary gear set of double-pinion type including a first sun gear, a first carrier, a first ring gear and at least one pair of pinion gears which are rotatably held by the first carrier and which mesh with each other. The first carrier is connected to the input rotary member, and constitutes at least a part of the first intermediate transmitting path. The first sun gear is fixed to the stationary member so as to be unrotatable. The first ring gear constitutes at least a part of the second intermediate transmitting path.

Each of the above-described first through fifteenth aspects of the invention provides the planetary-gear-type multiple-step transmission which is capable of establishing the drive positions with relatively width range of speed ratio and appropriate ratio steps between adjacent drive positions, by selectively engaging and releasing the four clutches and the two brakes. Further, the transmission of the invention can be made compact in size owing to its simple construction in which the first transmission unit is constituted principally by the two intermediate transmitting paths having the respective different speed ratios while the second transmission unit is constituted principally by the two planetary gear sets.

In the planetary-gear-type multiple-step transmission constructed according to the above-described third, fourth, eighth or ninth aspect of the invention, a shifting action between the third-speed position and the fourth-speed position requires switching of four frictional coupling devices from their released states to their engaged states or vice versa, namely, requires a complicated control of the frictional coupling devices. However, the transmission of the eighth aspect of the invention can be shifted between the third-speed position and the intermediate speed position, provided the predetermined condition is satisfied. Since the shifting action between the third-speed position and the intermediate speed position requires switching of only two frictional coupling devices from their released states to their engaged states or vice versa, it is possible to simplify the control of the frictional coupling devices and accordingly the shifting control of the transmission.

The above-described ninth aspect of the invention provides the planetary-gear-type multiple-step transmission which has the rear drive position in addition to the plurality of forward drive positions. Further, the above-described eleventh aspect of the invention provides the planetary-gear-type multiple-step transmission which can be made in compact.

The planetary-gear-type multiple-step transmission of the invention may be used for a front-engine front-drive (FF vehicle) in which the transmission is installed on a body of the vehicle such that the axis of the transmission is parallel to the transverse or lateral direction of the vehicle, or alternatively may be used for a front-engine rear-drive vehicle (FR vehicle) in which the transmission is installed on the vehicle body such that the axis of the transmission is parallel to the longitudinal or running direction of the vehicle.

The transmission of the invention may be arranged to be automatically shifted depending upon running conditions of the vehicle such as an operating amount of its accelerator pedal and a running speed of the vehicle, or alternately may be shifted manually by an operator of the vehicle, with a suitable control switch or switch device such as upshift or downshift switches. The transmission of the invention is capable of establishing at least six forward drive positions, and is advantageously used where seven or eight forward drive positions are required to be established. Where the transmission of the invention is adapted to have eight drive positions, it is preferable that the eight drive positions are provided by the first through eighth-speed drive positions as defined in the third aspect of the invention. Where the transmission of the invention is adapted to have six or seven drive positions, it is preferable that the six or seven drive positions are provided by selected six or seven of the first through eighth-speed drive positions as defined in the third aspect of the invention. Where the transmission of the invention is adapted to have six drive positions, it is preferable that the six drive positions are provided by the first through sixth-speed drive positions as defined in the third aspect of the invention. Where the transmission of the invention is adapted to have seven drive positions, it is preferable that the seven drive positions are provided by the first through seventh-speed drive positions as defined in the third aspect of the invention. Further, the transmission of the invention can be adapted to have a total of five or less drive positions. In such a case, the five or less drive positions may be provided by a selected five or less of the first through eighth-speed drive positions as defined in the third aspect of the invention.

The first, second, third and fourth clutches $C1$–$C4$ and the first and second brakes $B1$, $B2$ are preferably provided by hydraulically operated frictional coupling devices such as a multiple- or single-disc type clutch and a band brake which are activated by hydraulic actuators. However, they may be provided by coupling devices electromagnetically or otherwise operated. Further, for easier control of shifting actions of the transmission, a one-way clutch may be disposed in parallel with any one of the frictional coupling devices. For instance, a one-way clutch may be disposed in parallel with the second brake $B2$, so that the first-speed position can be established by engaging only the first clutch $C1$, and the second-speed position can be established by engaging only the first brake $B1$. A one-way clutch may be used in place of the second brake, if an engine brake application to the vehicle is not required. This is because a one-way clutch has a function of inhibiting a rotary motion of an element, like a brake.

In the transmission constructed according to the tenth aspect of the invention in which the first transmission unit has the planetary gear set, the second intermediate transmitting path of the first transmission unit has a speed ratio that is higher than 1.0 so that the rotary motion of the input rotary member is transmitted to the second transmission unit through the second intermediate transmitting path, with the speed of the rotary motion being reduced. Meanwhile, the first intermediate transmitting path of the first transmission unit has a speed ratio of 1.0 so that the rotary motion of the input rotary member is transmitted to the second transmission unit through the first intermediate transmitting path, without the speed of the rotary motion being changed. However, such an arrangement may be modified, for example, such that the first intermediate transmitting path has a speed ratio that is lower than 1.0 while the second intermediate transmitting path has a speed ratio of 1.0. It is noted that the planetary gear set of the first transmission unit is disposed coaxially with the planetary gear sets of the second transmission unit, for example.

In the transmission constructed according to the tenth aspect of the invention, the planetary gear set of the first transmission unit is preferably provided by a double-pinion type or single-pinion type planetary gear set having a sun gear, a carrier and a ring gear as the above-described three rotary elements, such that one of the sun gear, the carrier and the ring gear is connected to the input rotary so as to constitute at least a part of the above-described first intermediate transmitting path, another one of the sun gear, the carrier and the ring gear is fixed to the stationary member so as to be unrotatable, and still another one of the sun gear, the carrier and the ring gear serves as an intermediate output member constituting at least a part of the above-described second intermediate transmitting path, such that the rotary motion of the input rotary member is transmitted to the second transmission unit through the above-described still another one of the sun gear, the carrier and the ring gear, with the speed of the rotary motion being reduced.

Where the planetary gear set of the first transmission unit is of single-pinion type, a stepped pinion gear including a large-diameter portion and a small-diameter portion may be used as a pinion gear held by the carrier of the planetary gear set of the first transmission. In this case, the above-described three rotary elements may be provided by a sun gear (which meshes with one of the large-diameter portion and the small-diameter portion of the stepped pinion gear), a ring gear (which meshes with the other of the large-diameter portion and the small-diameter portion of the stepped pinion gear) and a carrier, or may be provided by a small-diameter sun gear (which meshes with the large-diameter portion of the stepped pinion gear), a large-diameter sun gear (which meshes with the small-diameter portion of the stepped pinion gear) and the carrier. Further, the three rotary elements may be provided also by a large-diameter ring gear (which meshes with the large-diameter portion of the stepped pinion gear), a small-diameter ring gear (which meshes with the small-diameter portion of the stepped pinion gear) and the carrier.

While the second transmission unit is constructed preferably as in the above-described fifth through seventh aspects of the invention, it may be otherwise constructed.

A positional relationship between the above-described one and other of the two planetary gear sets or between the second and third planetary gear sets of the second transmission unit is not particularly limited. The one and other of the two planetary gear sets or the second and third planetary gear sets may be axially arranged in this order of description or vice versa as viewed in a direction away from the drive power source. A location of each of the frictional coupling device is not particularly limited, either. The clutches and brakes may be disposed in a certain portion such as one of opposite end portions of the transmission, or alternatively, may be disposed in a plurality of portions such as the opposite end portions of the transmission.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 3 is a table indicating a relationship between drive positions of the transmission of FIG. 1 and combinations of operating states of hydraulically operated frictional coupling devices to establish the respective drive positions;

DETAILED DESCRIPTION OF THE PREFERRED EMBODIMENT

Figure 1:
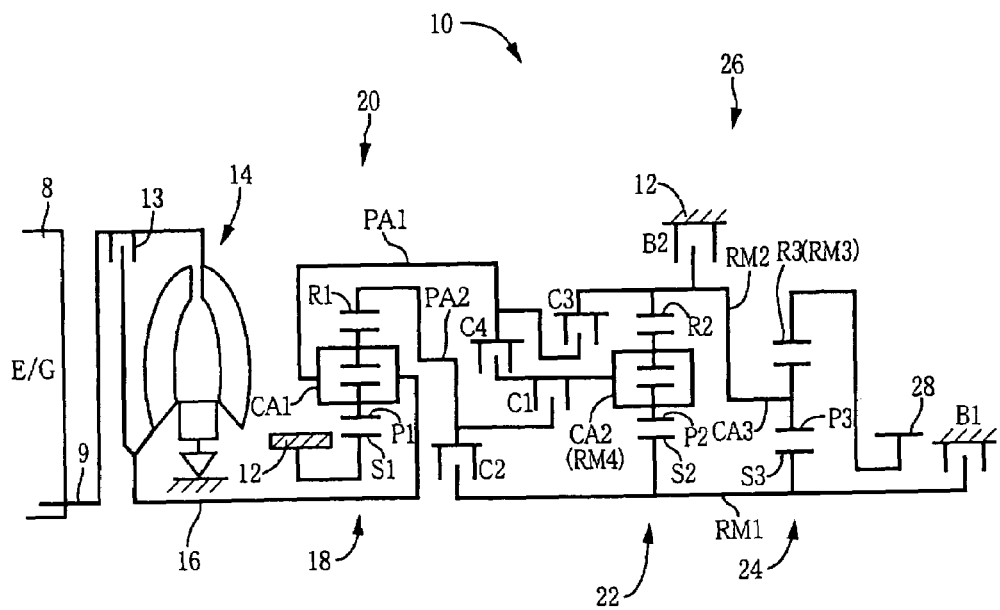
FIG. 1 is a schematic view illustrating a basic arrangement of a vehicle planetary-gear-type multiple-step transmission according to a first embodiment of the present invention.

Referring to first to the schematic view of FIG. 1, there is illustrated a basic arrangement of a vehicle automatic transmission in the form of a vehicle planetary gear type multiple-step transmission (hereinafter referred to simply as "transmission") 10, which is to be disposed between an engine 8 as a drive power source and drive wheels (not shown) so as to transmit an output of the engine 8 to the drive wheels. As shown in FIG. 1, the transmission 10 has a transmission casing 12 to be fixed to the body of the vehicle, and includes: a hydraulic transmission unit in the form of a torque converter 14 equipped with a lock-up clutch 13; an input shaft 16 connected to the torque converter 14; a first transmission unit 20 constituted principally by a first planetary gear set 18; a second transmission unit 26 constituted principally by a second planetary gear set 22 and a third planetary gear set 24; and an output gear 28. The torque converter 14, the input shaft 16, the first transmission unit 20, the second transmission unit 26 and the output gear 28 are disposed coaxially with each other within the transmission casing 12, in the order of description. The input shaft 16 serves as a turbine shaft of the torque converter 14, which in turn is connected to a crankshaft 9 of the engine 8. The output gear 26 is held in meshing engagement with a gear of a differential gear device (not shown), so as to rotate the right and left drive wheels through the differential gear. In the present first embodiment, the input shaft 16 and the output gear 28 function as an input rotary member and an output rotary member, respectively, while the transmission casing 12 functions as a stationary or non-rotary member. Since the transmission 10 is constructed symmetrically with respect to its axis, the lower half of the transmission 10 located below the axis is omitted in the schematic view of FIG. 1.

The first planetary gear set 18 constituting the first transmitting unit 20 is of double-pinion type, and includes a first sun gear S1, plural pairs of first planetary or pinion gears P1 (each pair of gears P1 mesh with each other), a first carrier CA1 supporting the first pinion gears P1, and a first ring gear R1 meshing with the first sun gear S1 through the first pinion gears P1. The first carrier CA1 supports the first pinion gears P1 such that the first pinion gears P1 are rotatable about their respective axes and are rotatable about the axis of the first sun gear S1. The first carrier CA1 is connected to the input shaft 16 so as to be driven by the input shaft 16, and serves as a transmitting member which constitutes a part of a first intermediate transmitting path PA1. The first sun gear S1 is fixed to the transmission casing 12 so as to be unrotatable. The first ring gear R1 serves as a transmitting member which constitutes a part of a second intermediate transmitting path PA2. A rotary motion of the input shaft 16 is transmittable to the second transmission unit 26 through the two different intermediate transmitting paths PA1, PA2 such that a speed of the rotary motion as transmitted through the second intermediate transmitting path PA2 is lower than a speed of the rotary motion as transmitted through the first intermediate transmitting path PA1. In the present first embodiment, the rotary motion of the input shaft 16 is transmitted to the second transmission unit 26 through the first intermediate transmitting path PA1 (which is partially constituted by the first carrier CA1 of the first planetary gear set 18), without the speed of the rotary motion being changed, namely, with a speed ration of 1.0. Meanwhile, the rotary motion of the input shaft 16 is transmitted to the second transmission unit 26 through the second intermediate transmitting path PA2 (which is partially constituted by the first carrier CA1, the first pinion gears P1 supported by the first carrier CA1 and the first ring gear R1), with the speed of the rotary motion being reduced, namely, with a speed ratio larger than 1.0.

The second planetary gear set 22 of the second transmitting unit 26 is of double-pinion type, and includes a second sun gear S2, plural pairs of second pinion gears P2 (each pair of gears P2 mesh with each other), a second carrier CA2 supporting the second pinion gears P2 (such that the second pinion gears P2 are rotatable about their respective axes and are rotatable about the axis of the second sun gear S2), and a second ring gear R2 meshing with the second sun gear S2 through the second pinion gears P2. The third planetary gear set 24 of the second transmitting unit 26 is of single-pinion type, and includes a third sun gear S3, a plurality of third pinion gears P3, a third carrier CA3 supporting the third pinion gears P3 (such that the third pinion gears P3 are rotatable about their respective axes and are rotatable about the axis of the third sun gear S3), and a third ring gear R3 meshing with the third sun gear S3 through the third pinion gears P3.

The second transmission unit 26 constitutes first, second, third and fourth rotary modules RM1–RM4, each of which is provided by at least one of the above-described sun gears S2, S3, carriers CA2, CA3 and ring gears R2, R3. Described specifically, the first rotary module RM1 is provided by the sun gear S2 of the second planetary gear set 22 and the sun gear S3 of the third planetary gear set 24 which are connected to each other. The second rotary module RM2 is provided by the ring gear R2 of the second planetary gear set 22 and the carrier CA3 of the third planetary gear set 24 which are connected to each other. The third rotary module RM3 is provided by the ring gear R3 of the third planetary gear set 24. The fourth rotary module RM4 is provided by the carrier CA2 of the second planetary gear set 22.

The first rotary module RM1 (S2, S3) is selectively connected to the transmission casing 12 through the first brake B1 so as to be unrotatable, while being selectively connected to the first ring gear R1 of the first planetary gear set 18 through the second clutch C2, i.e., to the second intermediate transmitting path PA2 through the second clutch C2. The second rotary module RM2 (R2, CA3) is selectively connected to the transmission casing 12 through the second brake B2 so as to be unrotatable, while being selectively connected to the carrier CA1 of the first planetary gear set 18 through the third clutch C3, i.e., to the first intermediate transmitting path PA1 through the third clutch C3. The third rotary module RM3 (R3) is integrally connected to the output gear 28. The fourth rotary module RM4 (CA2) is selectively connected to the first ring gear R1 of the first planetary gear set 18 through the first clutch C1, i.e., to the second intermediate transmitting path PA2 through the first clutch C1, while being selectively connected to the carrier CA1 of the first planetary gear set 18 through the fourth clutch C4, i.e., to the first intermediate transmitting path PA1 through the fourth clutch C4. It is noted that the first and second B1, B2 and the first, second, third and fourth clutches C1–C4 are all hydraulically operated frictional coupling devices, for example, of multi-disc type each having a plurality of friction plates which are superposed on each other and forced against each other by a hydraulic cylinder.

Figure 2:
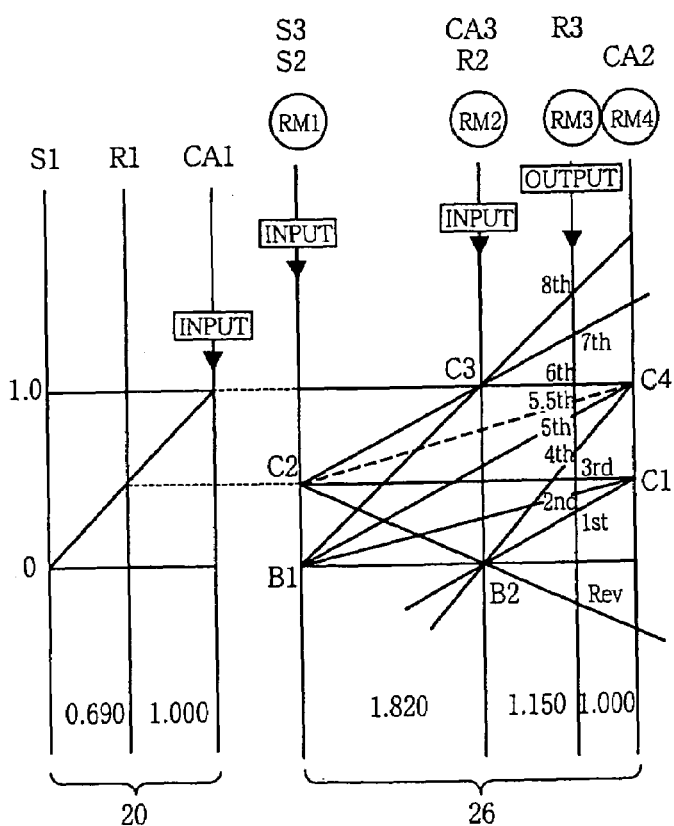
FIG. 2 is a collinear chart showing relative rotational speeds of a plurality of rotary modules incorporated in the transmission of FIG. 1.

FIG. 2 is a collinear chart indicating, by parallel straight lines, a relationship among the rotational speeds of the rotary modules in each of the drive positions of the transmission 10. In this collinear chart of FIG. 2, a lower horizontal straight line indicates the rotational speed of "0", while an upper horizontal straight line indicates the rotational speed of "1.0", i.e., the rotational speed of the input shaft 16 which is connected to the first intermediate transmitting path PA1. Three vertical straight lines of the first transmission unit 20 respectively represent three rotary elements of the first planetary gear set 18, i.e., the first sun gear S1, first ring gear R1 and carrier CA1 in this order of description as viewed in the direction from the left toward the right in the collinear chart of FIG. 3. The distances between the adjacent ones of the vertical straight lines are determined by a gear ratio $\rho_1$ of the first planetary gear set 18, i.e., a ratio of number of teeth of the first sun gear S1 to number of teeth of the first ring gear R1. In the example represented by the collinear chart of FIG. 2, the gear ratio $\rho_1$ of the first planetary gear set 18 is 0.592. Four vertical straight lines of the second transmission unit 26 respectively represent the first rotary module RM1 (S2, S3), the second rotary module RM2 (R2, CA3), the third rotary module RM3 (R3) and the fourth rotary module RM4 (CA2). The distances between the adjacent ones of the vertical straight lines are determined by gear ratios $\rho_2$, $\rho_3$ of the respective second and third planetary gear sets 22, 24. In the example represented by the collinear chart of FIG. 2, the gear ratios $\rho_2$, $\rho_3$ are 0.542 and 0.632, respectively. With the gear ratios $\rho_2$, $\rho_3$ being thus determined, the distance between the vertical straight lines representative of the third and fourth rotary modules RM3, RM4 is 1.000, while the distance between the vertical straight lines representative of the third and fourth rotary modules RM2, RM3 is 1.150, so that the distance between the vertical straight lines representative of the third and fourth rotary modules RM2, RM3 is made larger than the distance between the vertical straight lines representative of the third and fourth rotary modules RM3, RM4.

As is apparent from the collinear chart of FIG. 2, a first-speed position (1st speed position) having the highest speed ratio (i.e., the highest ratio of the rotational speed of the input shaft 16 to the rotational speed of the output gear 28) is established by engaging the first clutch C1 and the second brake B2. That is, with the first clutch C1 being brought into its engaged state, the rotary motion of the input shaft 16 is transmitted to the fourth rotary module RM4 through the first transmission unit 20 such that the fourth rotary module RM4 is rotated at a speed that is made lower than the rotational speed of the input shaft 16. With the second brake B2 being brought into its engaged state, the second rotary module RM2 is rendered unrotatable. Consequently, the third rotary module RM3 connected to the output gear 28 is rotated at a speed that is indicated by "1st" in the collinear chart of FIG. 2, while the transmission 10 is being placed in the 1st speed position.

A second-speed position (2nd speed position) having a speed ratio lower than that of the 1st speed position is established by engaging the first clutch C1 and the first brake B1. That is, with the first clutch C1 being brought into its engaged state, the fourth rotary module RM4 is rotated at the speed lower than the rotational speed of the input shaft 16. With the first brake B1 being brought into its engaged state, the first rotary module RM1 is rendered unrotatable. Consequently, the third rotary module RM3 is rotated at a speed that is indicated by "2nd" in the collinear chart of FIG. 2, while the transmission 10 is being placed in the 2nd speed position.

A third-speed position (3rd speed position) having a speed ratio lower than that of the 2nd speed position is established by engaging the first clutch C1 and the second clutch C2. That is, with the first clutch C1 being brought into its engaged state, the fourth rotary module RM4 is rotated at the speed lower than the rotational speed of the input shaft 16. With the second clutch C2 being brought into its engaged state, the rotary motion of the input shaft 16 is transmitted to the first rotary module RM1 through the first transmission unit 20 such that the first rotary module RM1 is rotated at the speed that is made lower than the rotational speed of the input shaft 16. Consequently, the third rotary module RM3 is rotated at a speed that is indicated by "3rd" in the collinear chart of FIG. 2, while the transmission 10 is being placed in the 3rd speed position.

A fourth-speed position (4th speed position) having a speed ratio lower than that of the 3rd speed position is established by engaging the fourth clutch C4 and the second brake B2. That is, with the fourth clutch C4 being brought into its engaged state, the rotary motion of the input shaft 16 is transmitted to the fourth rotary module RM4 through the first transmission unit 20 such that the fourth rotary module RM4 is rotated at the same speed as the input shaft 16. With the second brake B2 being brought into its engaged state, the second rotary module RM2 is rendered unrotatable. Consequently, the third rotary module RM3 is rotated at a speed that is indicated by "4th" in the collinear chart of FIG. 2, while the transmission 10 is being placed in the 4th speed position.

A fifth-speed position (5th speed position) having a speed ratio lower than that of the 4th speed position is established by engaging the fourth clutch C4 and the first brake B1. That is, with the fourth clutch C4 being brought into its engaged state, the fourth rotary module RM4 is rotated at the same speed as the input shaft 16. With the first brake B1 being brought into its engaged state, the first rotary module RM1 is rendered unrotatable. Consequently, the third rotary module RM3 is rotated at a speed that is indicated by "5th" in the collinear chart of FIG. 2, while the transmission 10 is being placed in the 5th speed position.

A sixth-speed position (6th speed position) having a speed ratio lower than that of the 5th speed position is established by engaging the third clutch C3 and the fourth clutch C4. That is, with the third clutch C3 being brought into its engaged state, the second rotary module RM2 is rotated at the same speed as the input shaft 16. With the fourth clutch C4 being brought into its engaged state, the fourth rotary module RM4 is rotated at the same speed as the input shaft 16. Consequently, the third rotary module RM3 is rotated at a speed that is indicated by "6th" in the collinear chart of FIG. 2, while the transmission 10 is being placed in the 6th speed position. The speed ration of this 6th speed position is 1.0.

A seventh-speed position (7th speed position) having a speed ratio lower than that of the 6th speed position is established by engaging the second clutch C2 and the third clutch C3. That is, with the second clutch C2 being brought into its engaged state, the first rotary module RM1 is rotated at the speed that is made lower than the rotational speed of the input shaft 16. With the third clutch C3 being brought into its engaged state, the second rotary module RM2 is rotated at the same speed as the input shaft 16. Consequently, the third rotary module RM3 is rotated at a speed that is indicated by "7th" in the collinear chart of FIG. 2, while the transmission 10 is being placed in the 7th speed position.

A eighth-speed position (8th speed position) having a speed ratio lower than that of the 7th speed position is established by engaging the third clutch C3 and the first brake B1. That is, with the third clutch C3 being brought into its engaged state, the second rotary module RM2 is rotated at the same speed as the input shaft 16. With the first brake B1 being brought into its engaged state, the first rotary module RM1 is rendered unrotatable. Consequently, the third rotary module RM3 is rotated at a speed that is indicated by "8th" in the collinear chart of FIG. 2, while the transmission 10 is being placed in the 8th speed position.

The transmission 10 has, in addition to the above-described eight drive positions, an intermediate speed position (5.5th speed position) which has a speed ratio lower than that of the 5th speed position and higher than that of the 6th speed position, and which is established by engaging the second clutch C2 and the fourth clutch C4. With the second clutch C2 being brought into its engaged state, the first rotary module RM1 is rotated at the speed that is made lower than the rotational speed of the input shaft 16. With the fourth clutch C4 being brought into its engaged state, the fourth rotary module RM4 is rotated at the same speed as the input shaft 16. Consequently, the third rotary module RM3 is rotated at a speed that is indicated by "5.5th" in the collinear chart of FIG. 2, while the transmission 10 is being placed in the 5.5th speed position.

The transmission 10 has, in addition to the above-described forward drive positions, a rear drive position which is established by engaging the second clutch C2 and the second brake B2. With the second clutch C2 being brought into its engaged state, the first rotary module RM1 is rotated at the speed that is made lower than the rotational speed of the input shaft 16. With the second brake B2 being brought into its engaged state, the second rotary module RM2 is rendered unrotatable. Consequently, the third rotary module RM3 is reversely rotated at a speed that is indicated by "Rev" in the collinear chart of FIG. 2, while the transmission 10 is being placed in the rear drive position.

FIG. 3 is a table indicating the operating states of the respective clutches C1–C4 and brakes B1, B2 in each of the above-described drive positions, and the speed ratio of each of the drive positions. In the table of FIG. 3, "○" (circle) indicates the engaged state of each of the frictional coupling devices, while blank (absence of the circle) indicates the released state of each frictional coupling device. The speed ratio of each drive position is dependent on the gear ratios $\rho_1$, $\rho_2$, $\rho_3$ of the respective first, second and third planetary gear sets 18, 22, 24. Where the gear ratios $\rho_1$, $\rho_2$, $\rho_3$ are 0.592, 0542 and 0.632, respectively ($\rho_1$=0.592, $\rho_2$=0.542, $\rho_3$=0.632) the drives position are given respective speed ratios as indicated in the table of FIG. 3, providing appropriate ratio steps between adjacent drive positions and also a ratio spread (i.e., the ratio step ($\gamma_1/\gamma_8$) ) that is as large as 7.472 (=4.579/0.613). Further, the rear drive position is given an appropriate speed ratio. It is therefore possible to obtain an appropriate characteristic regarding the speed ratios.

Figure 4:
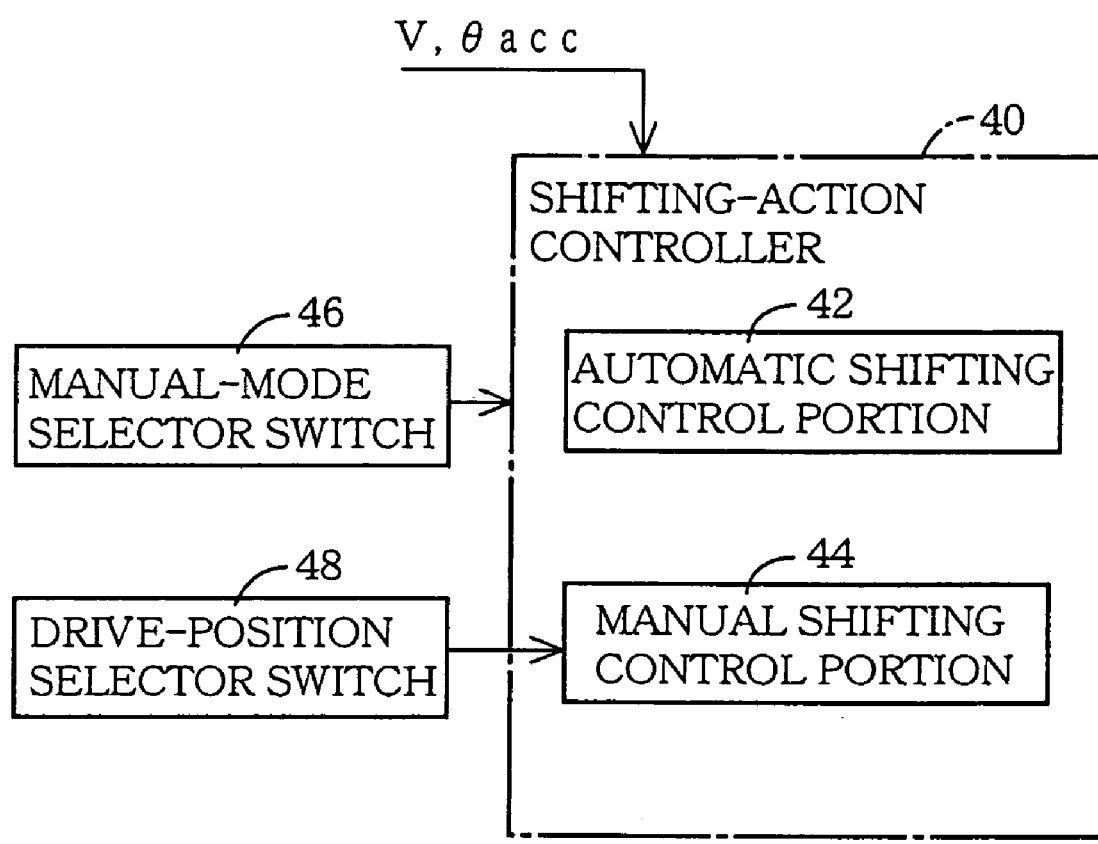
FIG. 4 is a block diagram showing a control system of the transmission of FIG. 1 by way of example.

FIG. 4 is a block diagram illustrating major functional means of a shifting-action controller (transmission controller) 40, which is incorporated in the transmission 10 for controlling the shifting actions of the transmission 10. The shifting-action controller 40 is equipped with a so-called microcomputer having a central processing unit (CPU), a read-only memory (ROM) and a random-access memory (RAM), and an input-output interface. The controller 40 includes an automatic shifting control portion 42 and a manual shifting control portion 44. Further, to the controller 40, there are supplied various signals which include a signal indicative of a running speed V of the vehicle, a signal indicative of an operating amount $\theta_{acc}$ of an accelerator pedal, a signal outputted by a manual-mode selector switch 46 and a signal outputted by a drive-position selector switch 48. The manual-mode selector switch 46 outputs the signal for selecting a manual mode while the drive-position selector switch 48 outputs the signal for manually upshifting, downshifting or selecting a desired drive position. These switches 46, 48 are disposed on an instrument panel of the vehicle, for example.

The automatic shifting control portion 42 of the controller 40 is adapted to read the signals outputted by the manual-mode selector switch 46 and the drive-position selector switch 48 at a predetermined time interval. Normally, the automatic shifting control portion 42 selects one of the 1st, 2nd, 3rd, 4th, 5th, 6th, 7th and 8th speed positions on the basis of the running speed V of the vehicle and the operating amount $\theta_{acc}$ of the accelerator pedal, and according to predetermined shifting patterns. However, when the accelerator pedal is rapidly released after having being considerably depressed while the 3rd-speed position is being established, namely, when the operating amount $\theta_{acc}$ of the accelerator pedal is rapidly reduced after having being considerably increased while the 3rd-speed position is being established, the transmission 10 is shifted from the 3rd-speed position to the 5.5th speed position. That is, when the transmission 10 can be shifted from the 3rd-speed position directly to the 5th- or 6th-speed position, the transmission 10 is shifted from 3rd-speed position to the 5.5th speed position, without being placed into the 4th-speed position and 5th-speed position. The shifting-action controller 40 includes a first-speed-position establishing portion, a second-speed-position establishing portion, a third-speed-position establishing portion, a fourth-speed-position establishing portion, a fifth-speed-position establishing portion, an intermediate-speed-position establishing portion, a sixth-speed-position establishing portion, a seventh-speed-position establishing portion and an eighth-speed-position establishing portion, each of which is operable when the corresponding speed position is selected, to cause the corresponding speed position to be established, by selectively engaging and releasing the clutches C1–C4 and the brakes B1, B2. The clutches C1–C4 and the brakes B1, B2 are selectively engaged and released by switching corresponding solenoid-operated valves from their ON states to OFF states or vice versa. For example, where the 4th-speed position is selected by the automatic shifting control portion 42, the fourth-speed-position establishing portion is operated to engage the fourth clutch C4 and the second brake B2 by placing corresponding solenoid-operated valves into their ON states.

The manual shifting control portion 44 of the controller 40 is operated when the manual mode is selected by the manual-mode selector switch 46, so as to effect an shifting action in response to the above-described signal outputted by the drive-position selector switch 48.

As described above, the transmission 10 constructed according to the present embodiment of the invention is capable of establishing the eight forward drive positions (nine forward drive positions including the 5.5th speed position), by selectively engaging and releasing the four clutches C1–C4 and the two brakes B1, B2. The transmission 10 can be made compact in size so as to be installable on a vehicle with a high degree of freedom, owing to its simple construction in which the first transmission unit 10 is constituted principally by the two intermediate transmitting paths PA1, PA2 having the respective different speed ratios while the second transmission unit 26 is constituted principally by the two planetary gear sets 22, 24. Further, as is apparent from the table of FIG. 3, the transmission 10 provides a wide range of speed ratio and appropriate ratio steps between adjacent drive positions.

Further, in the transmission 10, a shifting action between the 3rd-speed position and the 4th-speed position requires two frictional coupling devices to be released and other two frictional coupling devices to be engaged, namely, requires a complicated control of the frictional coupling devices. However, the transmission 10 can be directly shifted between the 3rd-speed position and the 5.5th-speed position, provided that the predetermined condition is satisfied. Since the shifting action between the 3rd-speed position and the 5.5th-speed position merely requires one frictional coupling device to be released and another one frictional coupling device to be engaged, it is possible to simplify the control of the frictional coupling devices and accordingly the shifting control of the transmission 10.

Further, the transmission 10 has, in addition to the eight forward drive positions, the rear drive position which is established by engaging the second clutch C2 and the second brake B2.

Further, in the transmission 10, the first, second and third planetary gear sets 18, 22, 24 are disposed in this order of description between the input shaft 16 and the output gear 28, and an output of the engine 8 is applied to the input shaft 16 of the transmission 10 through the torque converter 14 equipped with the lock-up clutch 13, so that the transmission 10 has a compact arrangement.

Figure 5:
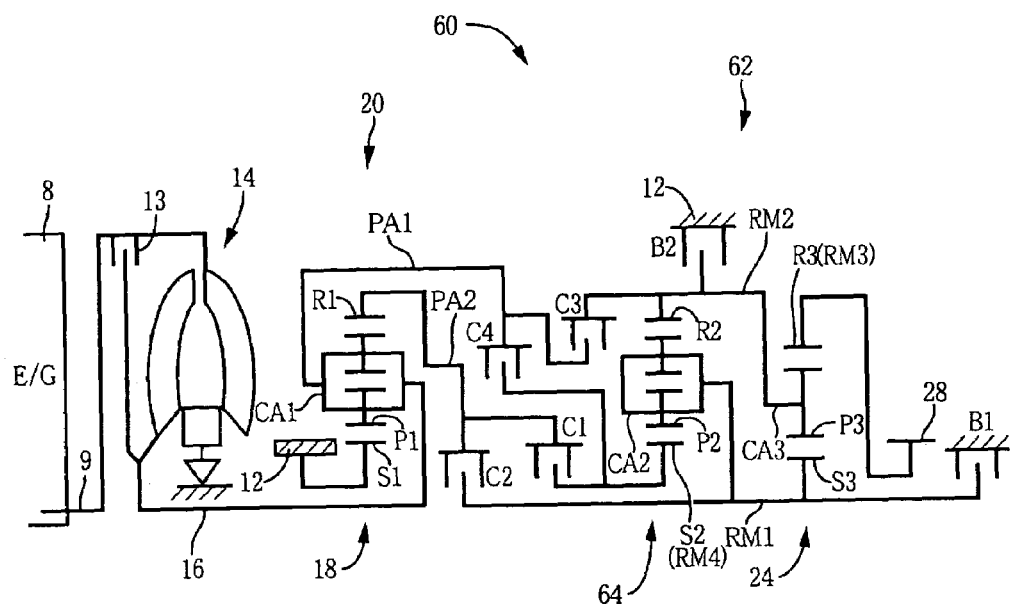
FIG. 5 is a schematic view corresponding to that of FIG. 1, illustrating a basic arrangement of a vehicle planetary-gear-type multiple-step transmission according to a second embodiment of the present invention.
Figure 6:
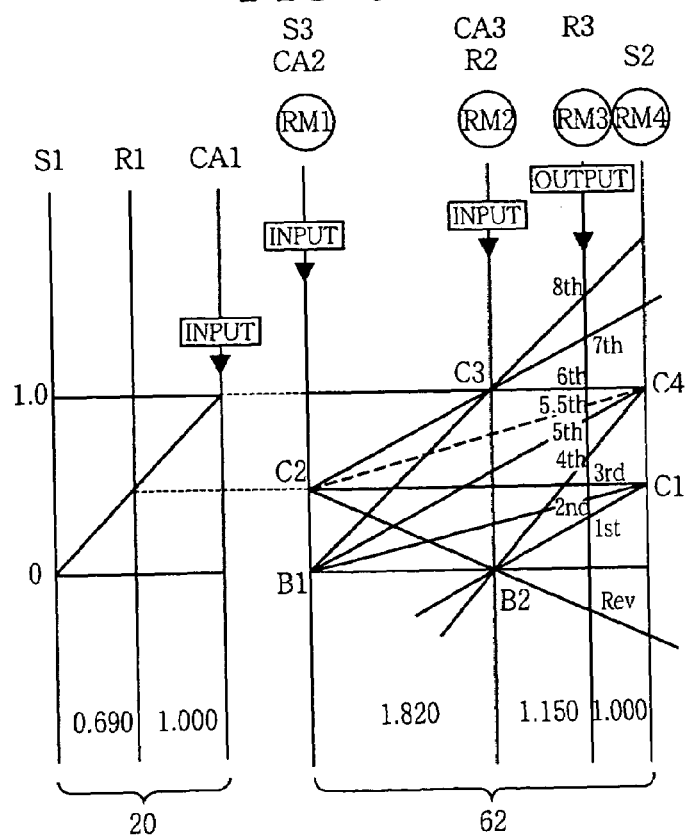
FIG. 6 is a collinear chart corresponding to that of FIG. 2, showing relative rotational speeds of a plurality of rotary modules incorporated in the multiple-step transmission of FIG. 5.

Referring to FIGS. 5 and 6, there will be described a second embodiment of this invention, wherein the same reference signs as used in the above-described first embodiment will be used to identify the functionally corresponding elements.

FIG. 5 is a schematic view illustrating a basic arrangement of a transmission 60 constructed according to the second embodiment of the invention. FIG. 6 is a collinear chart showing relative rotational speeds of the plurality of rotary modules incorporated in the multiple-step transmission 60. The transmission 60 is identical with the above-described transmission 10 of the first embodiment of FIGS. 1 and 2, except for construction of its second transmission unit 62 having a second planetary gear set 64 and a third planetary gear set 24.

In this second embodiment, the first rotary module RM1 is constituted by the carrier CA2 of the second planetary gear set 64 and the sun gear S3 of the third planetary gear set 24 which are connected to each other. The second rotary module RM2 is constituted by the ring gear R2 of the second planetary gear set 64 and the carrier CA3 of the third planetary gear set 24 which are connected to each other. The third rotary module RM3 is constituted by the ring gear R3 of the third planetary gear set 24. The. fourth rotary module RM4 is constituted by the sun gear S2 of the second planetary gear set 64.

The connection of each of the first through fourth rotary modules RM1–RM4 with the transmission casing 12, the intermediate transmitting paths PA1, PA2 or the output gear

28 in this second embodiment is the same as that in the above-described first embodiment. Described specifically, the first rotary module RM1 (CA2, S3) is selectively connected to the transmission casing 12 through the first brake B1, while being selectively connected to the second intermediate transmitting path PA2 through the second clutch C2. The second rotary module RM2 (R2, CA3) is selectively connected to the transmission casing 12 through the second brake B2, while being selectively connected to the first intermediate transmitting path PA1 through the third clutch C3. The third rotary module RM3 (R3) is connected to the output gear 28. The fourth rotary module RM4 (S2) is selectively connected to the second intermediate transmitting path PA2 through the first clutch C1, while being selectively connected to the first intermediate transmitting path PA1 through the fourth clutch C4.

The first and third planetary gear sets 18, 24 have respective gear ratios $\rho_1$ (=0.592), $\rho_3$ (=0.632) which are the same as those in the above-described first embodiment, while the second planetary gear set 64 has a gear ratio $\rho_2$ (=0.458) which is different from that of the second planetary gear set 22 in the above-described first embodiment. The relative rotational speeds of the rotary modules RM1–RM4 in the transmission 60 of this second embodiment is represented by the collinear chart of FIG. 6 that is substantially identical with the collinear chart of FIG. 2, although the elements constituting the respective rotary modules in this second embodiment are somewhat different from those in the first embodiment. Further, the forward and rear drive positions are established by selectively engaging and releasing the brakes B1, B2 and the clutches C1–C4, as shown in the table of FIG. 3, and provide the same speed ratios as in the first embodiment. That is, the transmission 60 of this second embodiment provides substantially the same advantages as the transmission 10 of the first embodiment.

Figure 7:
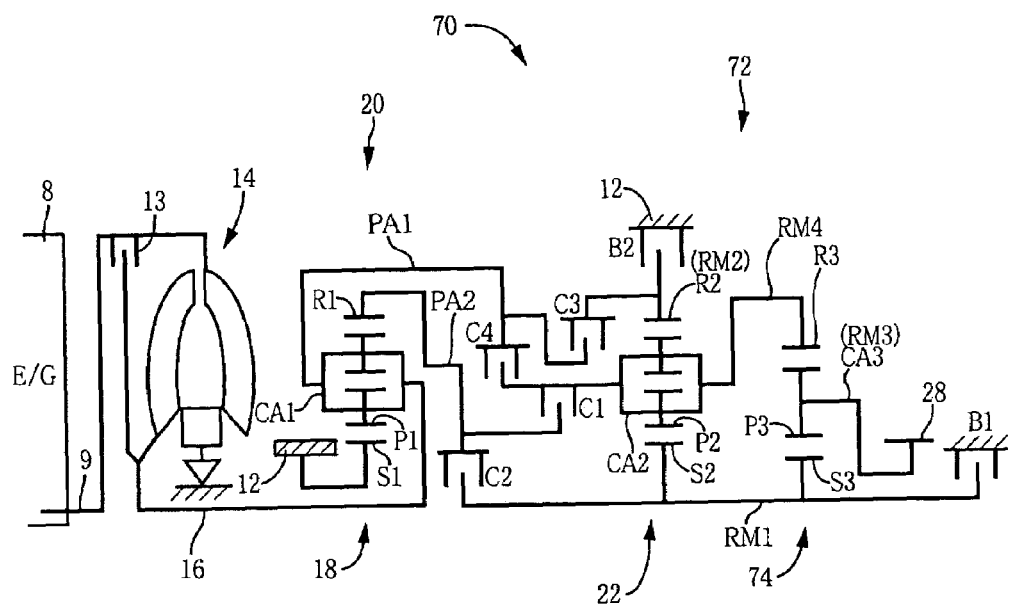
FIG. 7 is a schematic view corresponding to that of FIG. 1, illustrating a basic arrangement of a vehicle planetary-gear-type multiple-step transmission according to a third embodiment of the present invention.
Figure 8:
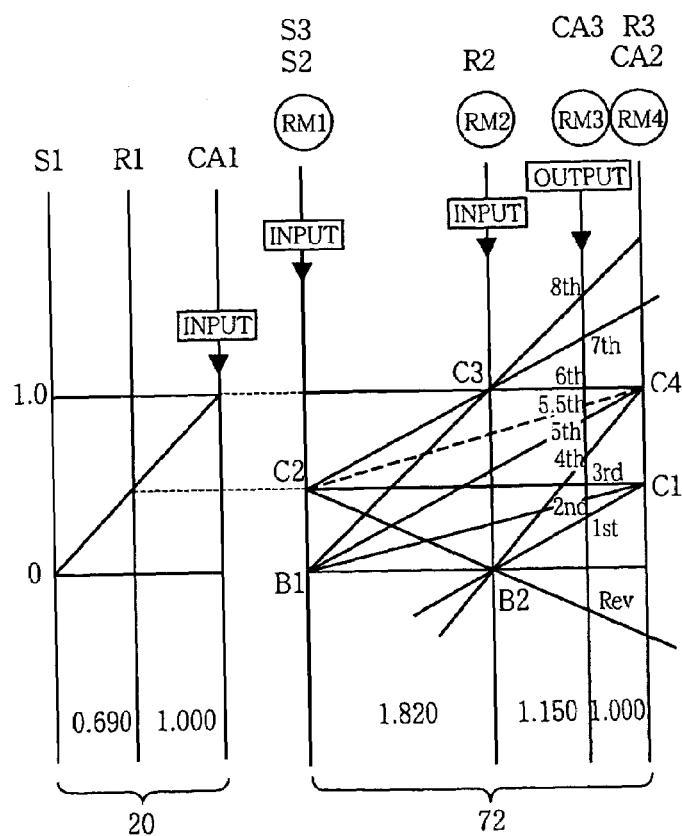
FIG. 8 is a collinear chart corresponding to that of FIG. 2, showing relative rotational speeds of a plurality of rotary modules incorporated in the multiple-step transmission of FIG. 7.

Referring to FIGS. 7 and 8, there will be described a third embodiment of this invention, wherein the same reference signs as used in the above-described first embodiment will be used to identify the functionally corresponding elements.

FIG. 7 is a schematic view illustrating a basic arrangement of a transmission 70 constructed according to the third embodiment of the invention. FIG. 8 is a collinear chart showing relative rotational speeds of the plurality of rotary modules incorporated in the multiple-step transmission 70. The transmission 70 is identical with the above-described transmission 10 of the first embodiment of FIGS. 1 and 2, except for construction of its second transmission unit 72 having a second planetary gear set 22 and a third planetary gear set 74.

In this third embodiment, the first rotary module RM1 is constituted by the sun gear S2 of the second planetary gear set 22 and the sun gear S3 of the third planetary gear set 74 which are connected to each other. The second rotary module RM2 is constituted by the ring gear R2 of the second planetary gear set 22. The third rotary module RM3 is constituted by the carrier CA3 of the third planetary gear set 74. The fourth rotary module RM4 is constituted by the carrier CA2 of the second planetary gear set 22 and the ring gear R3 of the third planetary gear set 74 which are connected to each other.

The connection of each of the first through fourth rotary modules RM1–RM4 with the transmission casing 12, the intermediate transmitting paths PA1, PA2 or the output gear 28 in this third embodiment is the same as that in the above-described first embodiment. Described specifically, the first rotary module RM1 (S2, S3) is selectively connected to the transmission casing 12 through the first brake B1, while being selectively connected to the second intermediate transmitting path PA2 through the second clutch C2. The second rotary module RM2 (R2) is selectively connected to the transmission casing 12 through the second brake B2, while being selectively connected to the first intermediate transmitting path PA1 through the third clutch C3. The third rotary module RM3 (CA3) is connected to the output gear 28. The fourth rotary module RM4 (CA2, R3) is selectively connected to the second intermediate transmitting path PA2 through the first clutch C1, while being selectively connected to the first intermediate transmitting path PA1 through the fourth clutch C4.

The first and second planetary gear sets 18, 22 have respective gear ratios $\rho_1$ (=0.592), $\rho_2$ (=0.642) which are the same as those in the above-described first embodiment, while the third planetary gear set 74 has a gear ratio $\rho_3$ (=0.337) which is different from that of the third planetary gear set 24 in the above-described first embodiment. The relative rotational speeds of the rotary modules RM1–RM4 in the transmission 70 of this third embodiment is represented by the collinear chart of FIG. 8 that is substantially identical with the collinear chart of FIG. 2, although the elements constituting the respective rotary modules in this third embodiment are somewhat different from those in the first embodiment. Further, the forward and rear drive positions are established by selectively engaging and releasing the brakes B1, B2 and the clutches C1–C4, as shown in the table of FIG. 3, and provide the same speed ratios as in the first embodiment. That is, the transmission 70 of this third embodiment provides substantially the same advantages as the transmission 10 of the first embodiment.

While the preferred embodiments of this invention have been described above in detail by reference to the drawings, for illustrative purpose only, it is to be understood that the present invention may be otherwise embodied.

In the above-described embodiments, the transmission has a total of eight forward drive positions (or nine forward drive positions) which are selectively established. However, in any one of the above-described embodiments, the shifting actions may be made by using six or seven forward drive positions rather than by using all the eight forward drive positions. In such cases, the used seven forward drive positions may consist of any seven of the above-described eight forward drive positions such as the 2nd- through 8th-speed positions, and the 1st- through 6th-speed positions and 8th-speed position (skipping over the 7th-speed position). Similarly, the used six forward drive positions may consist of any six of the above-described eight forward drive positions such as the 2nd- through 7th-speed positions, and the 2nd- through 6th-speed positions and 8th-speed position (skipping over the 7th-speed position). In these cases, one or ones of the above-described speed-position establishing portions of the shifting-action controller 40 corresponding to the non-used drive position or positions may be eliminated. Further, in any one of these cases, too, the transmission may be adapted to be shifted directly from the 3rd-speed position to the 5.5th-speed position or vice versa, provided that the predetermined condition is satisfied.

In the illustrated embodiments described above, the torque converter 14 of each of the transmissions 10, 60, 70, 80 is connected to the engine 8 through the crankshaft 9. However, the torque converter 14 may be operatively connected to the engine 8, for example, through suitable gears or belts. Further, the torque converter 14 does not have to be disposed coaxially with the engine 8. Still further, the engine 8 may be replaced with an electric motor or other power drive source.

In the illustrated embodiments, the torque converter 14 as the hydraulic transmission unit, which is disposed between the engine 8 and the input shaft 16, is equipped with the lock-up clutch 13. However, the torque converter 14 does not have to be equipped with the lock-up clutch 13. Further, the torque converter 14 may be replaced by a fluid coupling, an electromagnetic clutch of magnetic particle type, or a hydraulically operated clutch of multiple- or single-disc type.

While the presently preferred embodiments of the present invention have been illustrated above, it is to be understood that the invention is not limited to the details of the illustrated embodiments, but may be embodied with various other changes, modifications and improvements, which may occur to those skilled in the art, without departing from the spirit and scope of the invention defined in the following claims.

What is claimed is:

1. A planetary-gear-type multiple-step transmission for a vehicle, having a plurality of drive positions which are selectively established, said transmission comprising:
    a stationary member;
    an input rotary member;
    an output rotary member;
    a first transmission unit which is connected to said input rotary member; and
    a second transmission unit which is connected to said output rotary member,
    wherein said first transmission unit has first and second intermediate transmitting paths through which a rotary motion of said input rotary member is transmittable to said second transmission unit such that a speed of the rotary motion transmitted through said second intermediate transmitting path is lower than a speed of the rotary motion transmitted through said first intermediate transmitting path,
    wherein said second transmission unit includes two planetary gear sets each having a sun gear, a carrier and a ring gear, said second transmission unit further including first and second brakes, and first, second, third and fourth clutches,
    wherein said second transmission unit constitutes first, second, third and fourth rotary modules, each of which is provided by at least one of the sun gears, carriers and ring gears of said two planetary gear sets,
    wherein said first rotary module is selectively connected to said second intermediate transmitting path through said second clutch, while being selectively connected to said stationary member through said first brake,
    wherein said second rotary module is selectively connected to said first intermediate transmitting path through said third clutch, while being selectively connected to said stationary member through said second brake,
    wherein said third rotary module is connected to said output rotary member,
    wherein said fourth rotary module is selectively connected to said first intermediate transmitting path through said fourth clutch, while being selectively connected to said second intermediate transmitting path through said first clutch,
    wherein said plurality of drive positions are established by selectively engaging and releasing said brakes and said clutches,
    wherein said second rotary module is rotatable at a rotational speed, which is intermediate between rotational speeds of the respective first and third rotary modules except when the rotational speeds of said respective first and third rotary modules are equal to each other,
    wherein said third rotary module rotational speed which is intermediate between rotational speeds of the respective second and fourth rotary modules except when the rotational speeds of said respective second and fourth rotary modules are equal to each other,
    and wherein a difference between rotational speeds of the respective second and third rotary modules is larger than a difference between rotational speeds of the respective third and fourth rotary modules except when the rotational speeds of said respective second and fourth rotary modules are equal to each other.

2. The planetary-gear-type multiple-step transmission according to claim 1,
    wherein one of said two planetary gear sets is a double-pinion type planetary gear set, and includes said sun gear, said carrier, said ring gear and at least one pair of pinion gears which are rotatably held by said carrier and which mesh with each other,
    wherein the other of said two planetary gear sets is a single-pinion type planetary gear set, and includes said sun gear, said carrier and said ring gear,
    wherein said first rotary module includes said sun gear of said one of said two planetary gear sets and said sun gear of said other of said two planetary gear sets which are connected to each other,
    wherein said second rotary module includes said ring gear of said one of said two planetary gear sets and said carrier of said other of said two planetary gear sets which are connected to each other,
    wherein said third rotary module includes said ring gear of said other of said two planetary gear sets,
    and wherein said fourth rotary module includes said carrier of said one of said two planetary gear sets.

3. The planetary-gear-type multiple-step transmission according to claim 1,
    wherein one of said two planetary gear sets is a double-pinion type planetary gear set, and includes said sun gear, said carrier, said ring gear and at least one pair of pinion gears which are rotatably held by said carrier and which mesh with each other,
    wherein the other of said two planetary gear sets is a single-pinion type planetary gear set, and includes said sun gear, said carrier and said ring gear,
    wherein said first rotary module includes said carrier of said one of said two planetary gear sets and said sun gear of said other of said two planetary gear sets which are connected to each other,
    wherein said second rotary module includes said ring gear of said one of said two planetary gear sets and said carrier of said other of said two planetary gear sets which are connected to each other,
    wherein said third rotary module includes said ring gear of said other of said two planetary gear sets,
    and wherein said fourth rotary module includes said sun gear of said one of said two planetary gear sets.

4. The planetary-gear-type multiple-step transmission according to claim 1,
    wherein said first transmission unit has a planetary gear set having three rotary elements,
    wherein one of said three rotary elements of said planetary gear set of said first transmission unit is connected to said input rotary member, and constitutes at least a part of said first intermediate transmitting path, such that said rotary motion of said input rotary member is transmitted to said second transmission unit through said one of said three rotary elements of said planetary gear set of said first transmission unit, without the speed of said rotary motion being changed, wherein another one of said three rotary elements of said planetary gear set of said first transmission unit is fixed to said stationary member so as to be unrotatable, and wherein still another one of said three rotary elements of said planetary gear set of said first transmission unit constitutes at least a part of said second intermediate transmitting path, such that said rotary motion of said input rotary member is transmitted to said second transmission unit through said still another one of said three rotary elements of said planetary gear set of said first transmission unit, with the speed of said rotary motion being reduced.

5. The planetary-gear-type multiple-step transmission according to claim 1, further comprising a hydraulic transmission unit through which an output of a drive power source is transmitted to said input rotary member.

6. A planetary-gear-type multiple-step transmission for a vehicle, having at least eight drive position consisting of a first-speed position, a second-speed position having a speed ratio lower than that of said first-speed position, a third-speed position having a speed ratio lower than that of said second-speed position, a fourth-speed position having a speed ratio lower than that of said third-speed position, a fifth-speed position having a speed ratio lower than that of said fourth-speed position, a sixth-speed position having a speed ratio lower than that of said fifth-speed position, a seventh-speed position having a speed ratio lower than that of said sixth-speed position, and an eighth-speed position having a speed ratio lower than that of said seventh-speed position, said transmission comprising:

a stationary member;
an input rotary member;
an output rotary member;
a first transmission unit which is connected to said input rotary member; and
a second transmission unit which is connected to said output rotary member, wherein said first transmission unit has first and second intermediate transmitting paths through which a rotary motion of said input rotary member is transmittable to said second transmission unit such that a speed of the rotary motion transmitted through said second intermediate transmitting path is lower than a speed of the rotary motion transmitted through said first intermediate transmitting path, wherein said second transmission unit includes two planetary gear sets each having a sun gear, a carrier and a ring gear, said second transmission unit further including first and second brakes, and first, second, third and fourth clutches, wherein said second transmission unit constitutes first, second, third and fourth rotary modules, each of which is provided by at least one of the sun gears, carriers and ring gears of said two planetary gear sets, wherein said first rotary module is selectively connected to said second intermediate transmitting path through said second clutch, while being selectively connected to said stationary member through said first brake, wherein said second rotary module is selectively connected to said first intermediate transmitting path through said third clutch, while being selectively connected to said stationary member through said second brake, wherein said third rotary module is connected to said output rotary member, wherein said fourth rotary module is selectively connected to said first intermediate transmitting path through said fourth clutch, while being selectively connected to said second intermediate transmitting path through said first clutch, wherein said plurality of drive positions are established by selectively engaging and releasing said brakes and said clutches, wherein said first-speed position is established by engaging said first clutch and said second brake, wherein said second-speed position is established by engaging said first clutch and said first brake, wherein said third-speed position is established by engaging said first clutch and said second clutch, wherein said fourth-speed position is established by engaging said fourth clutch and said second brake, wherein said fifth-speed position is established by engaging said fourth clutch and said first brake, wherein said sixth-speed position is established by engaging said third clutch and said fourth clutch, wherein said seventh-speed position is established by engaging said second clutch and said third clutch, and wherein said eighth-speed position is established by engaging said third clutch and said first brake, said transmission further comprising a shifting-action controller which includes at least a third-speed-position establishing portion for causing said third-speed position to be established, and a fourth-speed-position establishing portion for causing said fourth-speed position to be established.

7. The planetary-gear-type multiple-step transmission according to claim 6, wherein said second rotary module is rotatable at a rotational speed which is intermediate between rotational speeds of the respective first and third rotary modules except when the rotational speeds of said respective first and third rotary modules are equal to each other, and wherein said third rotary module is rotatable at a rotational speed which is intermediate between rotational speeds of the respective second and fourth rotary modules except when the rotational speeds of said respective second and fourth rotary modules are equal to each other.

8. The planetary-gear-type multiple-step transmission according to claim 6, having, in addition to said eight drive positions, an intermediate speed position which has a speed ratio lower than that of said fifth-speed position and higher than that of said sixth-speed position and which is established by engaging said second clutch and said fourth clutch, said transmission being shifted to one of said third-speed position and said intermediate speed position directly from the other of said third-speed position and said intermediate speed position, without said transmission being placed into said fourth-speed position and said fifth-speed position, when a predetermined condition is satisfied.

9. The planetary-gear-type multiple-step transmission according to claim 6, having, in addition to said eight drive positions, a rear drive which is established by engaging said second clutch and said second brake.

10. A planetary-gear-type multiple-step transmission for a vehicle, having a plurality of drive positions which are selectively established, said transmission comprising:
a stationary member;

an input rotary member;
an output rotary member;
a first transmission unit which is connected to said input rotary member; and
a second transmission unit which is connected to said output rotary member,
wherein said first transmission unit has first and second intermediate transmitting paths through which a rotary motion of said input rotary member is transmittable to said second transmission unit such that a speed of the rotary motion transmitted through said second intermediate transmitting path is lower than a speed of the rotary motion transmitted through said first intermediate transmitting path,
wherein said second transmission unit includes two planetary gear sets each having a sun gear, a carrier and a ring gear, said second transmission unit further including first and second brakes, and first, second, third and fourth clutches,
wherein said second transmission unit constitutes first, second, third and fourth rotary modules, each of which is provided by at least one of the sun gears, carriers and ring gears of said two planetary gear sets,
wherein said first rotary module is selectively connected to said second intermediate transmitting path through said second clutch, while being selectively connected to said stationary member through said first brake,
wherein said second rotary module is selectively connected to said first intermediate transmitting path through said third clutch, while being selectively connected to said stationary member through said second brake,
wherein said third rotary module is connected to said output rotary member,
wherein said fourth rotary module is selectively connected to said first intermediate transmitting path through said fourth clutch, while being selectively engaging and releasing said brakes and said clutches,
wherein one of said two planetary gear sets is a double-pinion type planetary gear set, and includes said sun gear, said carrier, said ring gear and at least one pair of pinion gears which are rotatably held by said carrier and which mesh with each other,
wherein the other of said two planetary gear sets is a single-pinion type planetary gear set, and includes said sun gear, said carrier and said ring gear,
wherein said first rotary module includes said sun gear of said one of said two planetary gear sets and said sun gear of said other of said two planetary gear sets which are connected to each other,
wherein said second rotary module includes said ring gear of said one of said two planetary gear sets,
wherein said third rotary module includes said carrier of said other of said two planetary gear sets,
and wherein said fourth rotary module includes said carrier of said one of said two planetary gear sets and said ring gear of said other of said two planetary gear sets which are connected to each other.

11. A planetary-gear-type multiple-step transmission for a vehicle, having a plurality of drive positions which are selectively established, said transmission comprising:
a stationary member;
an input rotary member;
an output rotary member;
a first transmission unit which is connected to said input rotary member; and
a second transmission unit which is connected to said output rotary member,
wherein said first transmission unit has first and second intermediate transmitting paths through which a rotary motion of said input rotary member is transmittable to said second transmission unit such that a speed of the rotary motion transmitted through said second intermediate transmitting path is lower than a speed of the rotary motion transmitted through said first intermediate transmitting path,
wherein said second transmission unit includes two planetary gear sets, first and second brakes, and first, second, third and fourth clutches,
wherein a second planetary gear set as one of said two planetary gear sets is a double-pinion type planetary gear set, and includes a second sun gear, a second carrier, a second ring gear and at least one pair of pinion gears which are rotatably held by said second carrier and which mesh with each other,
wherein a third planetary gear set as the other of said two planetary gear sets is a single-pinion type planetary gear set, and includes a third sun gear, a third carrier and a third ring gear,
wherein said second sun gear and said third sun gear are selectively connected to said second intermediate transmitting path through said second clutch, while being selectively connected to said stationary member through said first brake,
wherein said second ring gear and said third carrier are selectively connected to said first intermediate transmitting path through said third clutch, while being selectively connected to said stationary member through said second brake,
wherein said third ring gear is connected to said output rotary member,
wherein said second carrier is selectively connected to said first intermediate transmitting path through said fourth clutch, while being selectively connected to said second intermediate transmitting path through said first clutch,
wherein said plurality of drive positions are established by selectively engaging and releasing said brakes and said clutches,
wherein said first transmission unit includes a first planetary gear set of double-pinion type including a first sun gear, a first carrier, a first ring gear and at least one pair of pinion gears which are rotatably held by said first carrier and which mesh with each other,
wherein said first carrier is connected to said input rotary member, and constitutes at least a part of said first intermediate transmitting path,
wherein said first sun gear is fixed to said stationary member so as to be unrotatable,
and wherein said first ring gear constitutes at least a part of said second intermediate transmitting path.

12. A planetary-gear-type multiple-step transmission for a vehicle, having a plurality of drive positions which are selectively established, said transmission comprising:
a stationary member;
an input rotary member;
an output rotary member;
a first transmission unit which is connected to said input rotary member; and
a second transmission unit which is connected to said output rotary member,
wherein said first transmission unit has first and second intermediate transmitting paths through which a rotary motion of said input rotary member is transmittable to said second transmission unit such that a speed of the rotary motion transmitted through said second intermediate transmitting path is lower than a speed of the rotary motion transmitted through said first intermediate transmitting path, wherein said second transmission unit includes two planetary gear sets, first and second brakes, and first, second, third and fourth clutches, wherein a second planetary gear set as one of said two planetary gear sets is a double-pinion type planetary gear set, and includes a second sun gear, a second carrier, a second ring gear and at least one pair of pinion gears which are rotatably held by said second carrier and which mesh with each other, wherein a third planetary gear set as the other of said two planetary gear sets is a single-pinion type planetary gear set, and includes a third sun gear, a third carrier and a third ring gear, wherein said second carrier and said third sun gear are selectively connected to said second intermediate transmitting path through said second clutch, while being selectively connected to said stationary member through said first brake, wherein said second ring gear and said third carrier are selectively connected to said first intermediate transmitting path through said third clutch, while being selectively connected to said stationary member through said second brake, wherein said third ring gear is connected to said output rotary member, wherein said second sun gear is selectively connected to said first intermediate transmitting path through said fourth clutch, while being selectively connected to said second intermediate transmitting path through said first clutch, wherein said plurality of drive positions are established by selectively engaging and releasing said brakes and said clutches, wherein said first transmission unit includes a first planetary gear set of double-pinion type including a first sun gear, a first carrier, a first ring gear and at least one pair of pinion gears which are rotatably held by said first carrier and which mesh with each other, wherein said first carrier is connected to said input rotary member, and constitutes at least a part of said first intermediate transmitting path, wherein said first sun gear is fixed to said stationary member so as to be unrotatable, and wherein said first ring gear constitutes at least a part of said second intermediate transmitting path.

13. A planetary-gear-type multiple-step transmission for a vehicle, having a plurality of drive positions which are selectively established, said transmission comprising;

a stationary member;

an input rotary member;

an output rotary member;

a first transmission unit which is connected to said input rotary member; and a second transmission unit which is connected to said output rotary member, wherein said first transmission unit has first and second intermediate transmitting paths through which a rotary motion of said input rotary member is transmittable to said second transmission unit such that a speed of the rotary motion transmitted through said second intermediate transmitting path is lower than a speed of the rotary motion transmitted through said first intermediate transmitting path, wherein said second transmission unit includes two planetary gear sets, first and second brakes, and first, second, third and fourth clutches, wherein a second planetary gear set as one of said two planetary gear sets is a double-pinion type planetary gear set, and includes a second sun gear, a second carrier, a second ring gear and at least one pair of pinion gears which are rotatably held by said second carrier and which mesh with each other, wherein a third planetary gear set as the other of said two planetary gear sets is a single-pinion type planetary gear set, and includes a third sun gear, a third carrier and a third ring gear, wherein said second sun gear and said third sun gear are selectively connected to said second intermediate transmitting path through said second clutch, while being selectively connected to said stationary member through said first brake, wherein said second ring gear is selectively connected to said first intermediate transmitting path through said third clutch, while being selectively connected to said stationary member through said second brake, wherein said third carrier is connected to said output rotary member, wherein said second carrier and said third ring gear are selectively connected to said first intermediate transmitting path through said fourth clutch, while being selectively connected to said second intermediate transmitting path through said first clutch, and wherein said plurality of drive positions are established by selectively engaging and releasing said brakes and said clutches.

14. The planetary-gear-type multiple-step transmission according to claim 13, wherein said first transmission unit includes a first planetary gear set of double-pinion type including a first sun gear, a first carrier, a first ring gear and at least one pair of pinion gears which are rotatably held by said first carrier and which mesh with each other, wherein said first carrier is connected to said input rotary member, and constitutes at least a part of said first intermediate transmitting path, wherein said first sun gear is fixed to said stationary member so as to be unrotatable, and wherein said first ring gear constitutes at least a part of said second intermediate transmitting path.

* * * * *